(12) United States Patent
Chen et al.

(10) Patent No.: US 8,767,294 B2
(45) Date of Patent: Jul. 1, 2014

(54) OPTIC WITH EXTRUDED CONIC PROFILE

(75) Inventors: Liying Chen, Redmond, WA (US);
Timothy Large, Bellevue, WA (US);
Neil Emerton, Redmond, WA (US);
Adrian Travis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 186 days.

(21) Appl. No.: 13/176,583

(22) Filed: Jul. 5, 2011

(65) Prior Publication Data

US 2013/0010355 A1    Jan. 10, 2013

(51) Int. Cl.
*G02B 23/08* (2006.01)

(52) U.S. Cl.
USPC ............................................ 359/402; 385/43

(58) Field of Classification Search
USPC ......... 359/451, 537, 592, 595, 597, 598, 402; 348/335, 336; 385/43, 39, 129, 130
See application file for complete search history.

(56) References Cited

U.S. PATENT DOCUMENTS

| 6,608,961 | B2 | 8/2003 | Travis |
| 7,333,692 | B1 | 2/2008 | Mossberg et al. |
| 7,410,286 | B2 | 8/2008 | Travis |
| 7,545,429 | B2 * | 6/2009 | Travis ........................... 348/335 |
| 8,160,409 | B2 * | 4/2012 | Large ............................ 385/36 |
| 2004/0196665 | A1 * | 10/2004 | Travis ........................... 362/558 |
| 2005/0196122 | A1 | 9/2005 | Tseng |
| 2006/0146573 | A1 * | 7/2006 | Iwauchi et al. ............... 362/621 |
| 2007/0019910 | A1 | 1/2007 | Greiner et al. |
| 2009/0154750 | A1 | 6/2009 | Kragelund |
| 2010/0150498 | A1 | 6/2010 | Large |
| 2010/0220956 | A1 | 9/2010 | Saarikko et al. |
| 2010/0302196 | A1 * | 12/2010 | Han et al. ...................... 345/173 |

OTHER PUBLICATIONS

Blume, et al., "Electromagnetic Waves in Conical Waveguides with Elliptic Cross Section", Retrieved at <<http://ieeexplore.ieee.org/stamp/stamp.jsp?tp=&arnumber=1133450>>,IEEE Transactions on Microwavetheory and Techniques, vol. MTT-34, No. 7, Oct. 30, 1985, pp. 835-838.

Kulik, Yakov, "Transfer Matrix of Conical Waveguides with any Geometric Parameters for Increased Precision in Computer Modeling", Retrieved at <<http://www.phys.unsw.edu.au/jw/reprints/Kulik.pdf, Oct. 2, 2007, pp. 6.

Travis, et al., "Collimated light from a waveguide for a display backlight", retrieved at <<http://download.microsoft.com/download/D/2/E/D2E425F8-CF3C-4C71-A4A2-70F9D4081007/OpticsExpressbacklightpaper.pdf>>, vol. 17, No. 22, Oct. 26, 2009, pp. 6.

\* cited by examiner

*Primary Examiner* — Frank Font
(74) *Attorney, Agent, or Firm* — Jeremy Snodgrass; Glen Johnson; Micky Minhas

(57) ABSTRACT

A transmission optic having a transparent sheet with opposing front and back faces and an end face adjacent the front and back faces. The separation between the back face and a nearest point on the front face varies as a conic function of distance along the front face from that point to the end face.

20 Claims, 6 Drawing Sheets

OPTIC WITH EXTRUDED CONIC PROFILE

BACKGROUND

Waveguide optics may be used to transport bundles of light rays, including images, and to alter their angular content. Such optics may offer low cost and high transmission efficiency. Furthermore, a waveguide optic may accomplish a desired optical transformation in a fraction of the space that conventional optics would require. For example, a point-source image can be expanded in a thin, wedge-shaped waveguide to fill a large-format display area, while conventional optics might require the image to be guided through a commensurate depth below the display area. Nevertheless, a waveguide optic may also cause various forms of image distortion, which are undesirable in high-fidelity imaging and display applications.

SUMMARY

Accordingly, one embodiment provides a transmission optic having a transparent sheet with opposing front and back faces and an end face adjacent the front and back faces. The separation between the back face and a nearest point on the front face varies as a conic function of distance along the front face from that point to the end face.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
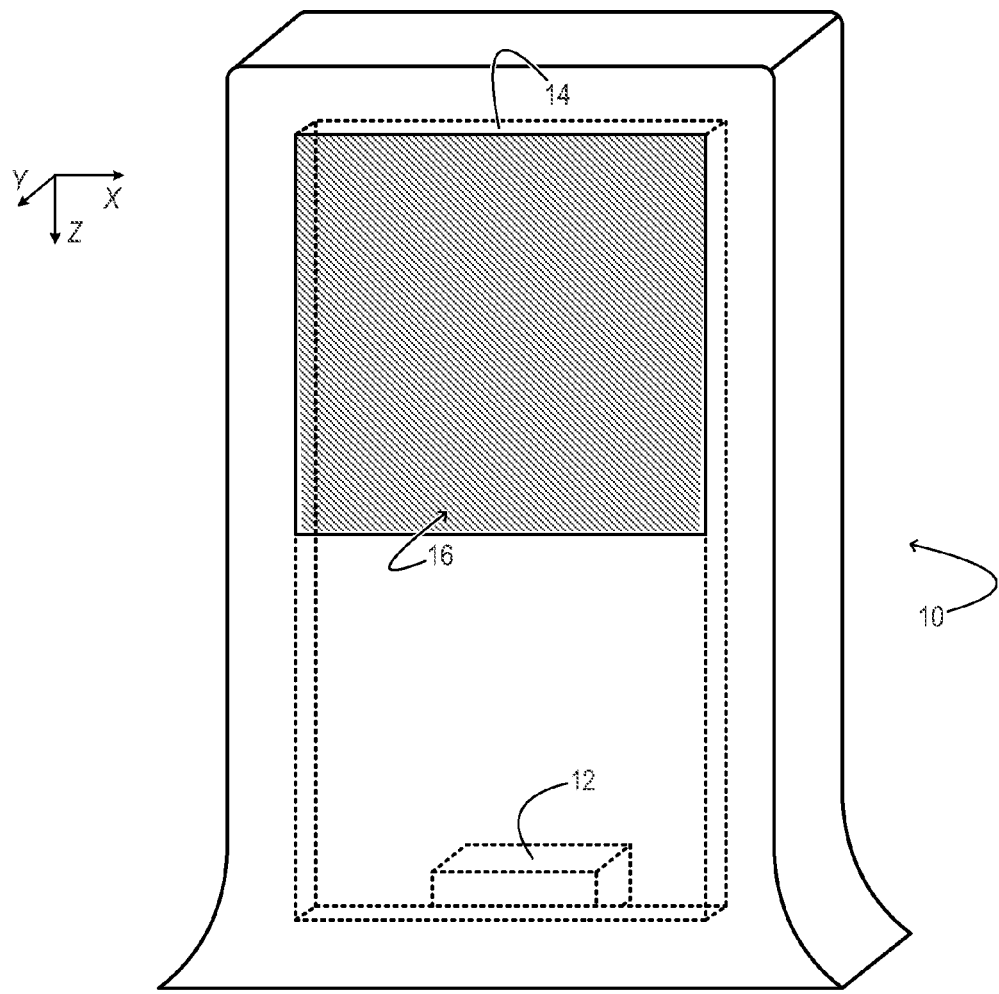
FIG. 1 shows aspects of a flat-panel display system in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. Except where particularly noted, the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example flat-panel display system 10. The display system may be used in various applications—as a computer or video-game monitor, a television or movie screen, an advertising billboard, etc. As such, the system may display a stream of video images—large-format, high-resolution, color images, in some embodiments.

As shown in FIG. 1, display system 10 includes projector 12 and transmission optic 14. Each image provided by the display system is transmitted through front face 16 of the transmission optic. In the illustrated embodiment, the front face is oriented vertically, for forward viewing. In other embodiments, the front face may be oriented horizontally or at an oblique angle. Accordingly, images from the display system may be viewed by an observer looking at the front face from above or below.

Figure 2:
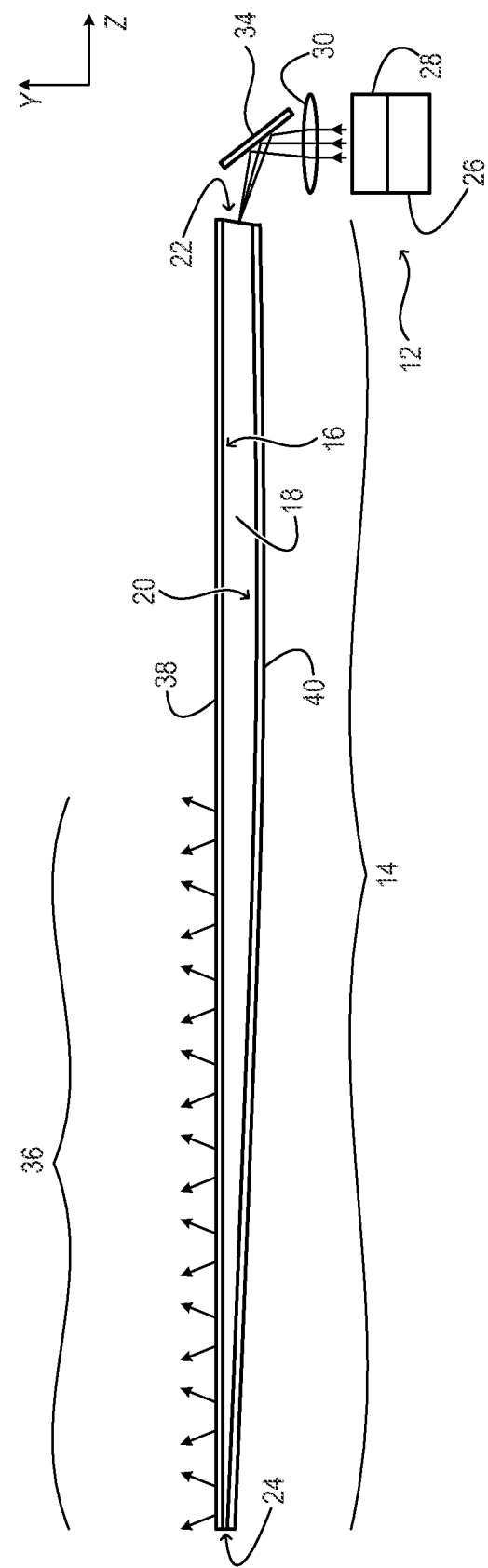
FIG. 2 shows aspects of a transmission optic and a projector in cross section in accordance with an embodiment of this disclosure.

Projector 12 is configured to form the images transmitted through transmission optic 14. This aspect is illustrated in FIG. 2, which shows additional aspects of the projector and the transmission optic. The transmission optic includes a transparent sheet 18 with a back face 20 opposite front face 16, and opposing end faces 22 and 24, each adjacent the front and back faces. In some embodiments, the sheet may be monolithic—i.e., formed in one piece, rather than being pieced together. The sheet may be formed from any suitably transparent material—acrylic, polycarbonate, or glass, for example. In one embodiment, the sheet may be injection-molded from a thermoplastic polymer. As shown in the drawing, the sheet may be quite thin relative to its length; the aspect ratio of the length to the greatest thickness of the sheet may be one-hundred or more, in some examples.

Projector 12 includes lamp 26, pixel array 28, and lens 30. The lamp may include any suitable monochromatic or broadband illumination source—a light-emitting diode (LED), laser, fluorescent lamp, or arc lamp, for example. The pixel array may be a rectangular array of micromirror or liquid-crystal display (LCD) elements. Operatively coupled to a controller (not shown in the drawings), the pixel array may be configured to spatially and temporally modulate the intensity of light reaching lens 30 to form a display image. In other embodiments, the pixel array may be an emissive array such as a plasma or LED array; in these embodiments, the lamp may be omitted.

In the illustrated embodiment, the image is transmitted through end face 22 of transparent sheet 18. The vergence of the image may be such that the ray bundle from each pixel converges to a point on front face 16 en route through transmission optic 14. Here the image from the lens is turned by reflection at plane mirror 34, so that the various display-system components can fit together more compactly. Naturally, other modes of optical coupling between the projector and the transmission optic are envisaged as well.

As noted above, projector 12 is configured to transmit a display image through end face 22. This image refracts through the end face within a range of incidence angles and, according to the principles outlined below, escapes from front face 16 over a corresponding, continuous range of distances from either end face. This range is identified in FIG. 2 as display region 36.

Transparent sheet 18 has nearly parallel front and back faces. Accordingly, some of the light entering end face 22 from the point source is subject to repeated total internal reflection (TIR) from the front and back faces as it propagates into the sheet (in the −Z direction in the drawing figures). As the separation between the front and back faces narrows, toward the left end of the sheet, each light ray is reflected at ever smaller incidence angles (expressed herein relative to the surface normal). Eventually, the incidence angle becomes subcritical, allowing the light ray to escape the sheet. Escape occurs at a distance from the entry face determined by the angle at which the light ray was received into the sheet—a more glancing ray traveling farther before escaping. In this manner, the display image is expanded in the direction of propagation.

Figure 3:
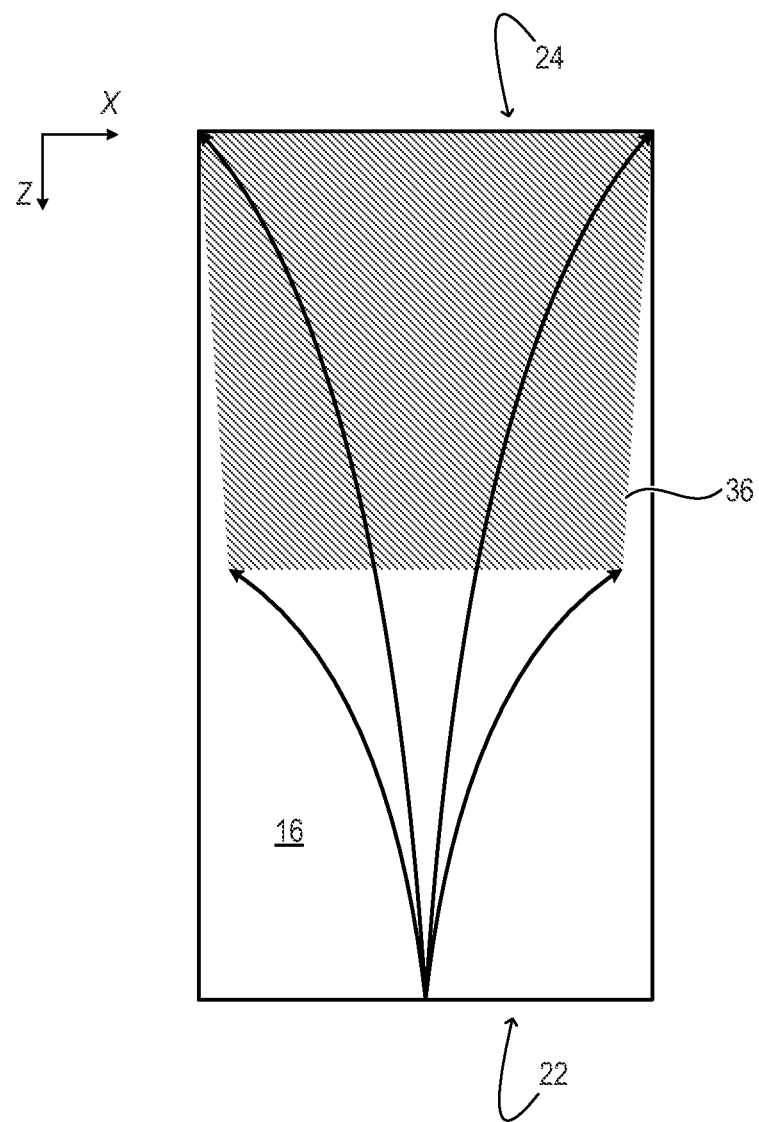
FIG. 3 shows aspects of a transmission optic from above in accordance with an embodiment of this disclosure.

While propagating through the sheet, the image also expands in the transverse direction (the ±X direction in the drawing figures). This aspect is shown in FIG. 3. Propagating light rays follow a segmented, curved path, as an increasing number of reflections cause each light ray to decelerate in the −Z direction.

Returning now to FIG. 2, each escaping light ray will exit front face 16 at a high escape angle (expressed herein relative to the surface normal). To ensure that the display image can be viewed forward of the front face, and over a suitable range of viewing angles, transmission optic 14 may include overcoat 38 supported on the front face of sheet 18. In some embodiments, the overcoat may include an optical diffuser. The optical diffuser may be a volume-type diffuser, which includes a random distribution of scattering centers, or a surface-relief diffuser, which presents an array of microscopic refractive features (e.g., lenslets) at the surface. Instead of, or in addition to an optical diffuser, the overcoat may include a turning film configured to turn the escaping light to the desired range of viewing angles.

In still other embodiments, overcoat 38 may include one or more visible-emitting phosphors excitable by ultraviolet (UV) light. This approach can effectively enable a monochromatic UV image, transmitted through the transmission optic without chromatic distortion, to produce a color display image by exciting the phosphors in the overcoat.

In the embodiment of FIG. 2, transmission optic 14 also includes cladding 40 supported on back face 20 of sheet 18. The cladding is a thin layer of material having a lower refractive index than the material from which sheet 18 is made. As such, the cladding promotes TIR at the back face while providing optical isolation between the transmission optic and components arranged behind it. Despite the advantages offered by overcoat 38 and cladding 40, either or both of these layers may be omitted in some embodiments.

Figure 4:
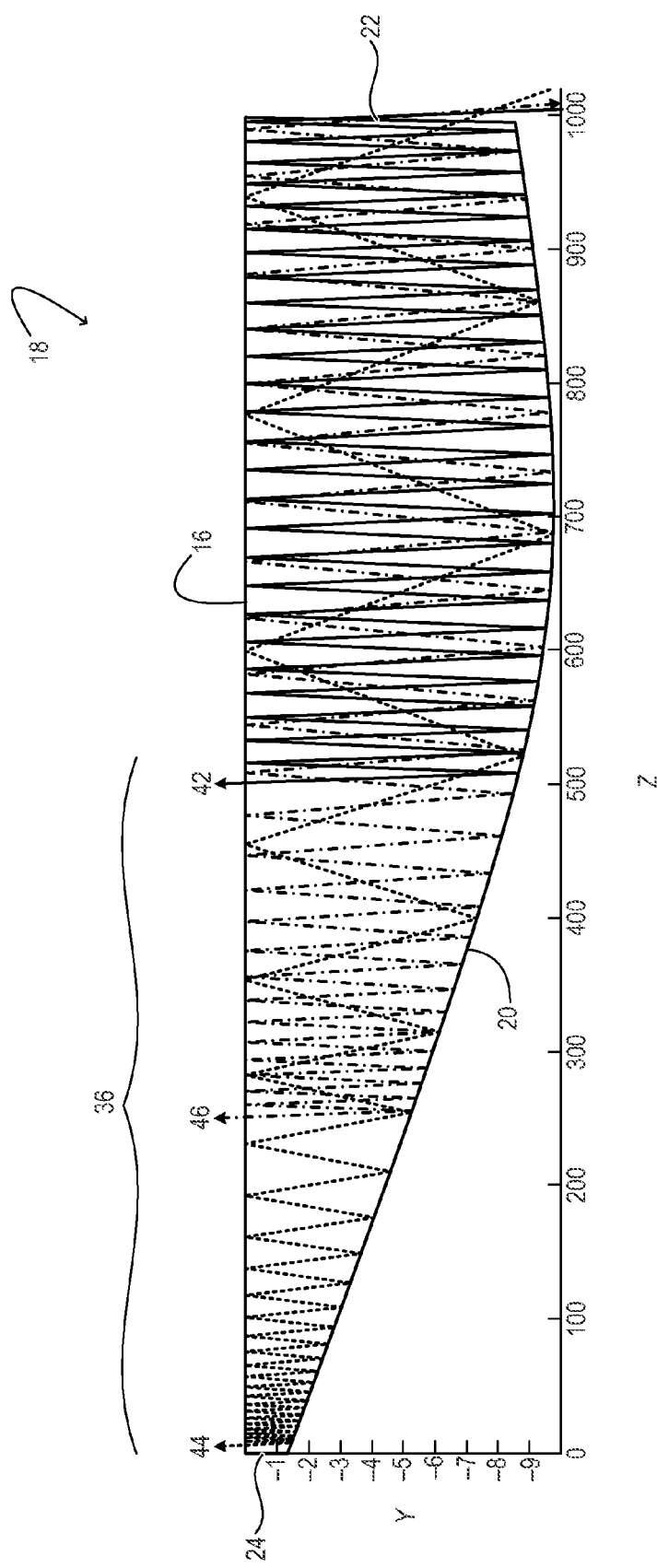
FIG. 4 shows aspects of a transparent sheet in cross section in accordance with an embodiment of this disclosure.

FIG. 4 is a vertically expanded, cross-sectional view of transparent sheet 18 in one embodiment. The drawing shows three light rays refracting into end face 22 and escaping through front face 16 to form a display image. Ray 42 enters at the largest incidence angle and emerges closest to the end face. Ray 44 enters at the smallest incidence angle and emerges farthest from the end face. Both of these rays, and all rays of intermediate angles of incidence—like ray 46, undergo fifty-two reflections inside the sheet. More generally, each light ray refracted through the end face of a properly configured sheet within a suitable range of incidence angles will undergo an equal number of reflections from the front and back faces. This constraint enables such rays to escape from the front face over a corresponding, continuous range of distances from either end face. By making the range of distances as great as possible, for a given length of the sheet, the size of display region 36 is maximized. In one non-limiting example, this range may span at least half the length of the sheet.

When the above constraint is not met—i.e., when light rays undergo a variable number of reflections that depends on the incidence angle—the image becomes divided lengthwise (along Z) into a series of bands, with rays of every other band escaping from front face 16, while rays of the remaining bands escape from back face 20. Viewed from the front face, the image will therefore be incomplete.

One way to prevent such banding is to restrict the range of incidence angles of the light rays accepted into the optic, so that only those rays that would undergo an equivalent number of reflections are accepted. This approach will naturally reduce the length of display region 36, a disadvantage for most display applications. Another way to prevent the banding is to decrease the aspect ratio of the waveguide, making it thicker for a given length. As a result, the range of incidence angles that result in an equivalent number of reflections is increased. However, making the transmission optic thicker may reduce transmittance and may increase materials cost of the optic. In addition, a thicker optic, if formed by injection molding, will take longer to harden, thereby increasing manufacturing costs.

Figure 5:
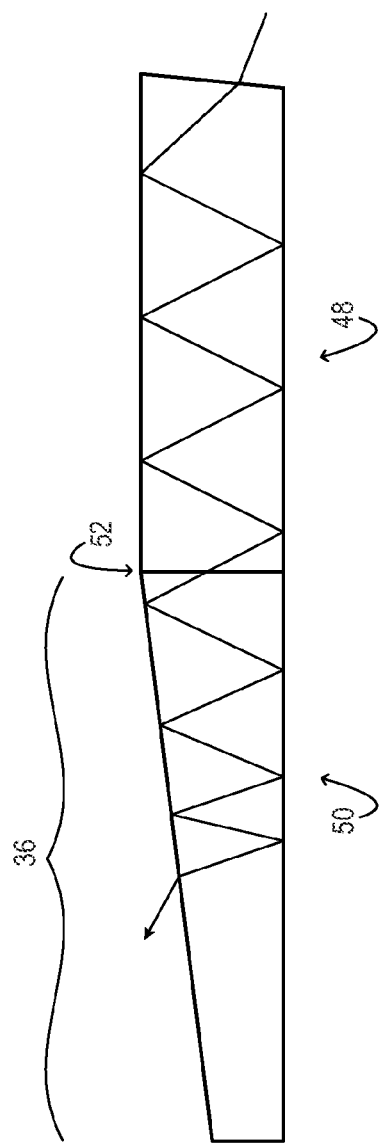
FIG. 5 shows, in cross section, a transmission optic formed from an expansion section and a separate escape section.

Another constraint on the shape of the transmission optic relates to the desired shape of the display image. As shown in FIG. 3, the image that emerges from the front face of the sheet is, in general, a distorted trapezoid. For most display applications, the desired image should be as rectangular as possible. In other words, the image should undergo significant expansion in the ±X direction before the first rays begin to escape. This effect may be accomplished with a transmission optic in which the relative pitch of the front and back faces varies along the length of the optic. For example, a transmission optic may, as shown in FIG. 5, be formed in two sections: an expansion section 48 in which the image expands but does not escape, and an escape section 50 in which the image escapes while continuing to expand. In this approach, however, the gradient discontinuity at 52 may give rise to unwanted optical effects, such as astigmatism.

Figure 6:
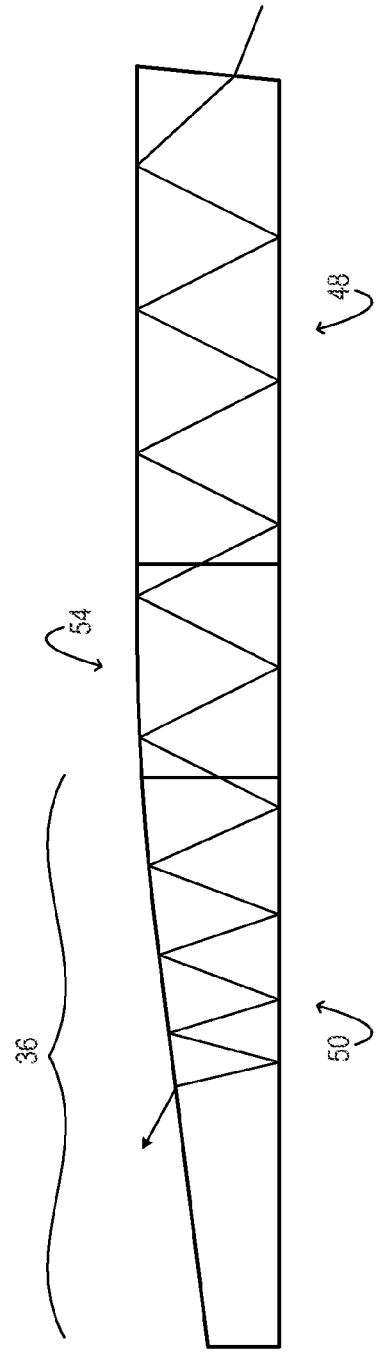
FIG. 6 shows, in cross section, a transmission optic formed from an expansion section and a separate escape section joined by a transition region.

As shown in FIG. 6, it is possible to smooth over the gradient discontinuity, thereby creating a transition region 54. In practice, however, the transition region must be made quite smooth—i.e., long—in order to provide suitable display quality. Accordingly, enacting this approach may involve sacrificing valuable sheet length that might otherwise be used for display region 36. In addition, the approach shown in FIG. 6 may result in an unnecessarily thick transmission optic, because the surface gradient of expansion section 48 is arbitrarily set to zero.

The detailed approach illustrated in FIG. 4 and described hereinafter addresses the various issues noted above. It provides that the separation between back face 20 and the nearest point on front face 16 varies as a conic function of distance along the front face from that point to either end face. The conic function is equal to a constant plus a term linear in the distance plus a square root of a quadratic polynomial of the distance—viz., $$\delta(Z) = a_0 + a_1 Z + \sqrt{b_0 + b_1 Z + b_2 Z^2}.$$

In the equation above, $\delta$ is the separation between the back face and the nearest point on the front face, Z is the distance referred to above, and $a_0$, $a_1$, $b_0$, $b_1$, and $b_2$ are constants.

In some embodiments, such as the one shown in FIG. 4, front face 16 is planar, and back face 20 is an extrusion of the conic function in a direction parallel to the length of either end face. To describe an optic in which the front face of the sheet is planar, the origin of a (Z, Y) coordinate system may be positioned at the intersection of front face 16 and end face 24, opposite the face at which the light rays enter the transparent sheet. The profile of the front face is then Y(Z)=0, and the profile of the back face is Y(Z)=$\delta$. In the example of FIG. 4, the illustrated profile of the back face is given by the conic function shown above, with $a_0$=−9.39134, $a_1$=−0.00419, $b_0=65.11000$, $b_1=-0.18650$, and $b_2=0.00015$. In this example, end face 22 meets the front face at Z=1016, which is the overall length of the optic. An optic with a planar front face is desirable for many applications. It will be understood, however, that the front face not be planar in every embodiment. Rather, the entire sheet may in some instances follow a curve, or even undulate.

Display-image projection is a useful application area for the transmission optics described hereinabove. Nevertheless, various other applications are envisaged also. For example, transmission optic 14 may be configured as a highly diffuse illumination panel, such as a backlight for a large-format LCD panel. Here, projector 12 would be replaced by a broadband light source. In another example, narrow-band infrared light (IR) may be coupled into the transmission optic. The transmission optic in this configuration could provide illumination for an IR vision system.

In still other embodiments, the transmission optic may be configured to transmit light in the direction opposite to what is disclosed hereinabove. In other words, an image may be received into front face 16 of transmission optic 14. The high-angle portion of that image may couple into the optic, propagate by TIR toward end face 22, and converge at the focal point of a camera. In such embodiments, projector 12 may be replaced by the camera configured to receive the image.

In one particular embodiment, this adaptation may be used to construct a flat-panel periscope. The periscope may include a transmission optic with a transparent sheet, as described hereinabove, and a camera. The camera may be configured to receive an image from the end face of the transmission optic, the image refracting through the end face within a range of incidence angles and entering the front face over a corresponding, continuous range of distances from the end face. In some examples, the range of distances may span at least half the length of the transparent sheet.

The configurations described above enable various methods for making a transmission optic. Accordingly, some such methods are now described, by way of example, with continued reference to the above configurations. It will be understood, however, that the methods here described, and others fully within the scope of this disclosure, may be enabled by other configurations as well. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 7:
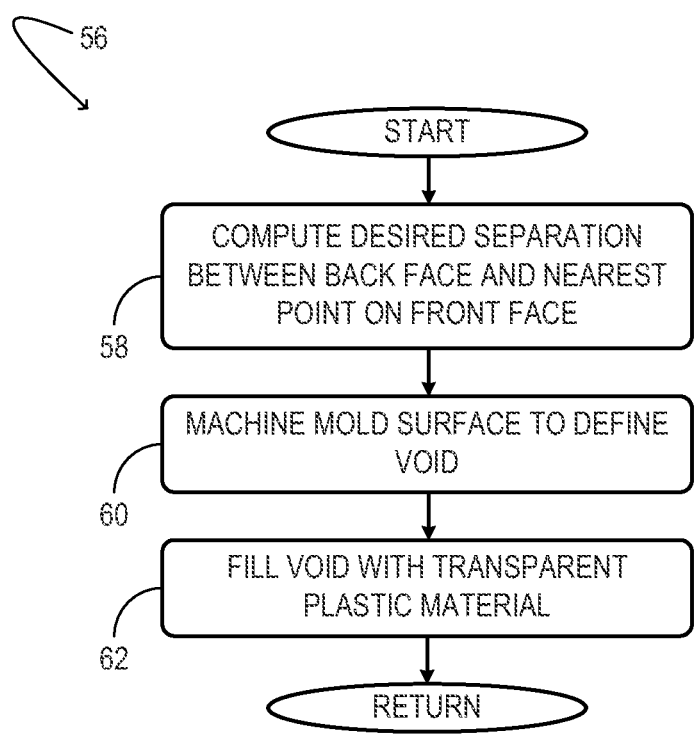
FIG. 7 illustrates an example method for making a transmission optic in accordance with an embodiment of this disclosure.

FIG. 7 illustrates an example method 56 for making a transmission optic comprising a transparent sheet with opposing front and back faces and an end face adjacent the front and back faces. At 58 of method 56, a desired separation between the back face and a nearest point on the front face is computed. More specifically, the separation is computed as a conic function of distance along the front face from that point to the end face. At 60, at least one mold surface is machined to define a void conforming to the conic function. At 62, the void is filled with a transparent plastic material.

In some embodiments, the void is filled by injection molding. In other words, the transparent plastic material is injected in liquid form upon the at least one mold surface. The at least one mold surface is then cooled to harden the transparent plastic material. After cooling, the sheet is then released from the at least one mold surface.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A transmission optic comprising:
a transparent sheet with opposing front and back faces and an end face adjacent the front and back faces, a separation between the back face and a nearest point on the front face varying as a conic function of distance along the front face from that point to the end face, the conic function equal to a constant plus a term linear in the distance plus a square root of a quadratic polynomial of the distance,
a shape of the transparent sheet being such that an incidence angle of light propagating through the sheet initially increases, relative to a surface normal of the sheet, and then decreases with each successive bounce.

2. The transmission optic of claim 1 wherein the front face is planar.

3. The transmission optic of claim 2 wherein a profile of the back face is an extrusion of the conic function in a direction parallel to a length of the end face.

4. The transmission optic of claim 1 wherein light refracted through the end face within a range of incidence angles escapes from the front face over a corresponding, continuous range of distances from the end face, and wherein the range of distances spans at least half the length of the sheet.

5. The transmission optic of claim 4 wherein each light ray refracted within the range of incidence angles undergoes an equal number of reflections within the sheet.

6. The transmission optic of claim 1 wherein the sheet is monolithic.

7. The transmission optic of claim 1 wherein the sheet comprises acrylic or polycarbonate or glass.

8. The transmission optic of claim 1 wherein the sheet is injection-molded.

9. The transmission optic of claim 1 wherein an aspect ratio of a length-to-greatest-thickness of the sheet is one-hundred or more.

10. The transmission optic of claim 1 further comprising one or more of an optical diffuser and a turning film supported on the front face of the sheet.

11. The transmission optic of claim 1 further comprising a phosphor supported on the front face of the sheet.

12. The transmission optic of claim 1 further comprising a cladding supported on the back face of the sheet, the cladding having a lower refractive index than the sheet.

13. The transmission optic of claim 1 wherein the end face is a first of two opposing end faces each adjacent the front and back faces, and wherein the separation is greatest between the first and second end faces and tapers down on approaching both the first end face and the second end face.

14. The transmission optic of claim 1 wherein the end face is a first of two opposing end faces each adjacent the front and back faces, and wherein a separation between the back face and a nearest point on the front face varies as a conic function of a complementary distance along the front face from that point to the second end face, the conic function equal to a constant plus a term linear in the complementary distance plus a square root of a quadratic polynomial of the complementary distance.

15. A transmission optic comprising:
a transparent sheet with opposing front and back faces and opposing first and second end faces each adjacent the front and back faces, a separation between the back face and a nearest point on the front face varying as a conic function of distance along the front face from that point to the first end face, the separation being greatest between the first and second end faces and tapering down on approaching both the first end face and the second end face, the conic function equal to a constant plus a term linear in the distance plus a square root of a quadratic polynomial of the distance.

16. The transmission optic of claim 15 further comprising one or more of an optical diffuser, a turning film, and a phosphor overcoat supported on the front face of the transmission optic.

17. The transmission optic of claim 15 further comprising a camera configured to receive an image from the first end face of the transmission optic, the image refracting through the first end face within a range of incidence angles and entering the front face over a corresponding, continuous range of distances from the first end face, the range of distances spanning at least half the length of the sheet.

18. A method for making a transmission optic comprising a transparent sheet with opposing front and back faces and opposing first and second end faces each adjacent the front and back faces, the method comprising:
computing a desired separation between the back face and a nearest point on the front face as a conic function of distance along the front face from that point to the first end face, the separation being greatest between the first and second end faces and tapering down on approaching both the first end face and the second end face, the conic function equal to a constant plus a term linear in the distance plus a square root of a quadratic polynomial of the distance;
machining at least one mold surface to define a void conforming to the conic function; and
filling the void with a transparent plastic material.

19. The method of claim 18 wherein filling the void includes injecting the transparent plastic material in liquid form upon the at least one mold surface.

20. The method of claim 18 further comprising:
cooling the at least one mold surface to harden the transparent plastic material; and
after cooling, releasing the sheet from the at least one mold surface.

* * * * *